United States Patent [19]

Reneau et al.

[11] 4,438,901
[45] Mar. 27, 1984

[54] APPARATUS FOR TENSIONING A STUD AND METHOD OF DOING SAME

[75] Inventors: Bobby J. Reneau; Bruce E. Morris, both of Houston, Tex.

[73] Assignee: Gripper, Inc., Houston, Tex.

[21] Appl. No.: 342,235

[22] Filed: Jan. 25, 1982

[51] Int. Cl.³ .............................................. E21B 19/00
[52] U.S. Cl. ................................. 254/29 A; 81/57.38; 29/452
[58] Field of Search ................... 254/29 A; 81/57.38; 29/452

[56] References Cited

U.S. PATENT DOCUMENTS

| | | | |
|---|---|---|---|
| 450,780 | 4/1891 | Dodge | 91/152 |
| 2,760,393 | 8/1956 | Stough | 81/57.38 |
| 2,866,370 | 12/1958 | Biach . | |
| 3,285,568 | 11/1956 | Biach . | |
| 3,338,552 | 11/1957 | Persicke . | |
| 3,494,592 | 2/1970 | Meschonat et al. | 254/29 A |
| 3,749,362 | 7/1973 | O'Connor et al. . | |
| 3,815,874 | 6/1974 | Jones . | |
| 3,821,934 | 7/1974 | Maeda | 254/105 |
| 3,844,533 | 10/1974 | Markiewicz et al. . | |
| 3,995,828 | 12/1976 | Orban . | |
| 4,175,453 | 11/1979 | Exner et al. | 254/29 A |
| 4,249,718 | 1/1981 | Heaton . | |

FOREIGN PATENT DOCUMENTS 355134 11/1970 Canada .
1427774 7/1966 France .

*Primary Examiner*—Robert C. Watson
*Attorney, Agent, or Firm*—Pravel, Gambrell, Hewitt, Kirk & Kimball

[57] ABSTRACT

An apparatus for tensioning a stud and a method for doing same, with the apparatus including a body adapted to be removably mounted with the stud, the body including a first body member and second body member movable with respect thereto, with the second body member having a gripper assembly therewith for gripping the stud as desired, and moving means with the body for moving the second body member with respect to the first body member from a contracted position wherein the gripper assembly engages the stud and in expanded position wherein the gripper assembly tensions the stud.

9 Claims, 3 Drawing Figures

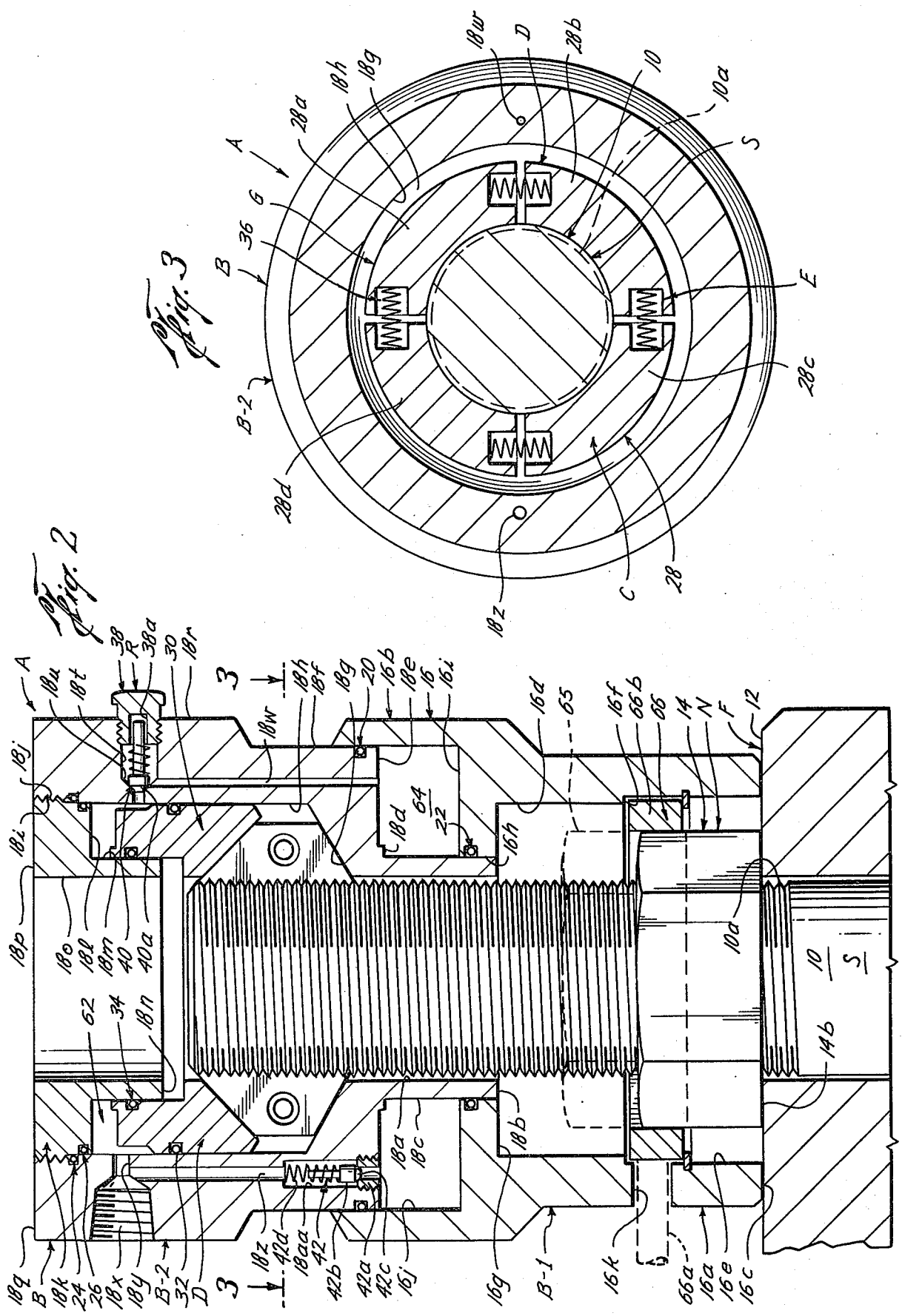

APPARATUS FOR TENSIONING A STUD AND METHOD OF DOING SAME

FIELD OF THE INVENTION

The present invention relates generally to the field of tensioning device, and more particularly to those that are used to tension a stud to thereafter permit the threading of a nut thereon the tensioned stud for retaining stud tension.

DESCRIPTION OF THE PRIOR ART

In the makeup of stud and nut assemblies requiring extremely high tension loads on studs, such as in the makeup of a flange for a nuclear reactor vessel wherein stud tensions may easily exceed 100,000 pounds of tension upon a stud, it is preferred to tension the stud prior to threading of the nut into an engaging position with the surface of a flange in order to effectuate retainage of such high stud tensions. This is true not only for stud-nut assemblies, but also for bolt-nut and other similar assemblies.

It has been known in the prior art that devices for tensioning studs have fallen generally into two classifications, namely those that are non-hydraulically actuated and those that are hydraulically actuated. So far as known, typical devices that are non-hydraulically actuated are such as those disclosed in U.S. Pat. Nos. 3,285,568 and 3,749,262.

On the other hand, there are a variety of hydraulically actuated stud tensioning devices that are also known in the prior art. Some of these devices require permanent affixation to the stud-nut assembly to be tightened, such as disclosed in U.S. Pat. No. 2,866,370. Other types of devices require a double-nut arrangement in order to operate effectively in combination with the hydraulic power, as shown in U.S. Pat. No. 3,338,552 (and its corresponding French Pat. No. 1.437.774 and Canadian Pat. No. 855,134). Other types of hydraulically actuated bolt and/or stud tensioning devices are shown in U.S. Pat. Nos. 3,815,874; 3,844,533 and 4,249,718 as well as U.S. Pat. No. 3,995,828.

However, as noted above, some of these devices require permanent affixation to each individual stud-bolt/nut assembly and are not suited for individual stud tensioning-nut tightening operations which thereafter are removable to adjacent stud-nut assemblies for tightening, but rather must be dedicated to particular stud-bolt-nut assemblies. Furthermore, so far as known, some of the prior art stud tensioning devices are incapable of generating the longitudinal forces sufficient to tension studs/bolts when such forces exceed well over 150,000 pounds of tension. Further, some devices have no way of insuring that the threads of the stud and/or bolt extending from the surface are protected from damage by the use of such stud tensioning devices, prior to actual tensioning operations.

SUMMARY OF THE INVENTION

The present invention relates to a new and improved apparatus for tensioning a stud extending from a surface and a method of doing same wherein the apparatus includes a body adapted to be removably mounted with the stud, the body including a first and second body member with the second body member being movable with respect to the first, and the second body member having a gripper assembly therein for gripping the stud as desired and further including means with the body for moving the second body with respect to the first body from a contracted position wherein the gripper assembly engages the stud to an expanded position wherein the gripper assembly tensions the stud.

BRIEF DESCRIPTION OF THE DRAWINGS

FIG. 2 is a sectional, elevational view similar to that of FIG. 1, showing the apparatus for tensioning stud of the present invention wherein the collet means is in an engaging position and the second body member is in an expanded position with respect to the first body member, for tensioning the stud; and, FIG. 3 is a sectional, plan view of the apparatus for tensioning the stud of the present invention, taken along the lines 3—3 of FIG. 2, illustrating the collet means of the present invention.

DESCRIPTION OF THE PREFERRED EMBODIMENT

Figure 1:
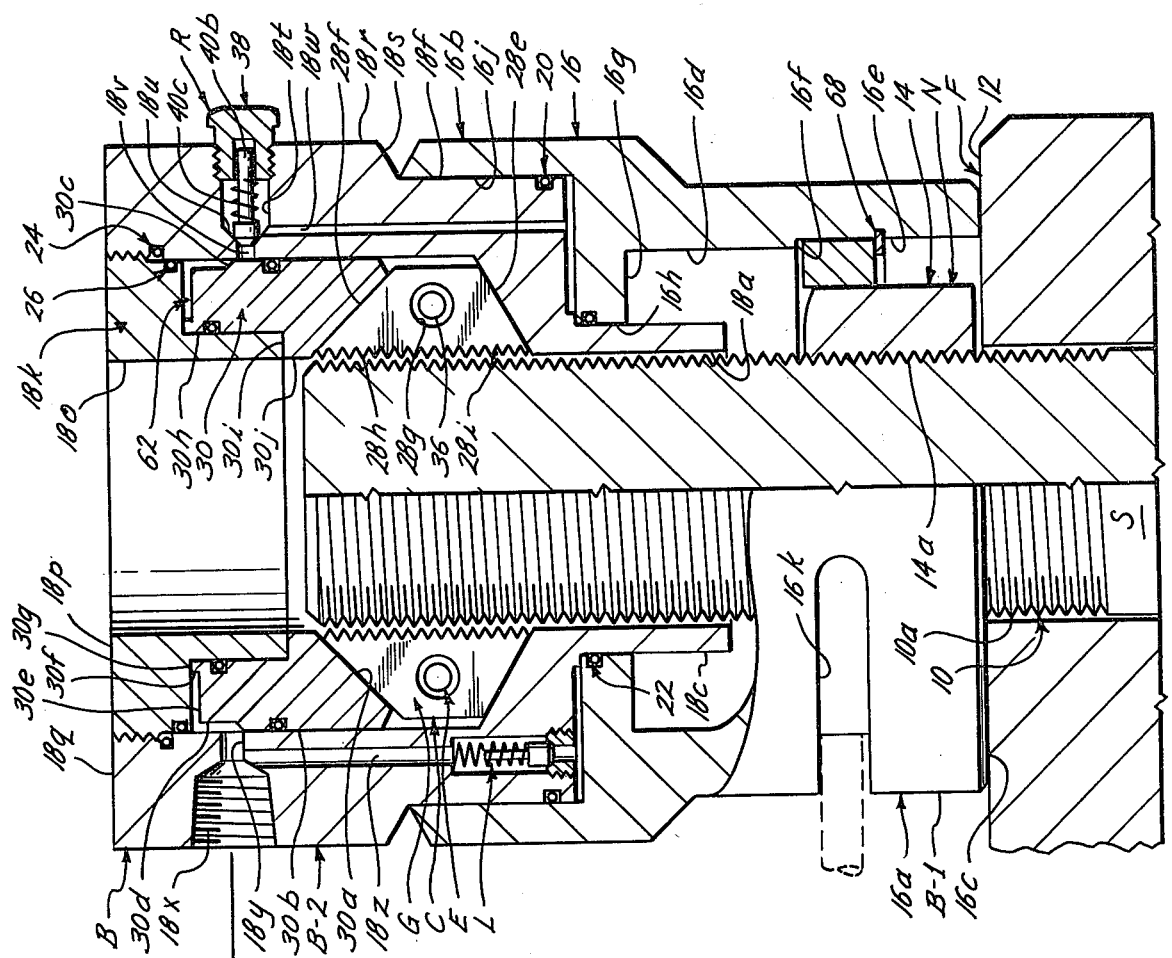
FIG. 1 is a sectional, elevational, partially schematic view of the apparatus for tensioning the stud of the present invention, showing the collet means in a retracted position with respect to the first body member.

In the drawings, the letter A designates generally the apparatus for tensioning a stud S extending from a surface F. The apparatus A includes generally a body B, gripper means G, and moving means M. Unless otherwise specified, the components of the apparatus A of the present invention are made of steel or other suitable high strength materials capable of taking the high stresses and strains encounted in utilizing an apparatus A for tensioning such a stud S.

The apparatus A of the present invention is adapted to be used for tensioning a stud S. The stud S may include any type of threaded rod such as a stud 10 having threads 10a, a bolt (not shown) or any other similar type of device with a threaded shaft extending from a surface F. Thus, in the specification set forth hereinbelow, reference to a stud S is broad enough to encompass all types of threaded shafts extending from a surface F. Similarly, the surface F may be any type of surface such as a flange surface 12 or any other type of surface. As is conventionally known, typically a suitable nut N including nut 14 having threaded bore 14a is adapted to be received with the compatibly formed threads 10a of the stud 10 of the stud S. Typical threaded action of the nut 14 on the stud 10 results in the lower surface 14b of the nut engaging the flange surface 12 of the surface F for proper makeup thereof. However, such conventional makeup is unsatisfactory in that a sufficient amount of torque may not be applied to the nut N for proper tensioning of the stud S. Typical tensioning of the stud S is required in order to properly tighten and secure, by way of example, opposing faces of a flange and other similar types of structures that require a makeup between two parts, assemblies or the like. It is in this environment that the apparatus A of the present invention is desired to be used to tension the stud S extending from the surface F prior to the nut N being threaded fully on the stud S into engagement with the surface F.

The apparatus A of the present invention includes a body B adapted to be removably mounted with the stud S extending from the surface F. The body B includes a first body member B-1 and a second body member B-2. The first body member B-1 includes a first housing 16 having a surface engaging end 16a and a chamber end 16b. The surface engaging end 16a includes an engaging surface 16c which is adapted to be positioned in engagement with flange surface 12 of surface F. First housing 16 is further formed having a first nut bore 16d and a second nut bore 16e of slightly larger diameter, separated by annular lip 16f, with the nut N adapted to be disposed within the first and second nut bores 16d, 16e, respectively, as discussed more fully hereinbelow. The first nut bore 16d includes a radial surface 16g adjacent to the upper end thereof with second housing bore 16h formed adjacent thereto. Radial surface 16i is formed adjacent to second housing bore 16h, with annular surface 16j extending upwardly from the radial surface 16i. The second housing bore 16h, radial surface 16i and annular surface 16j form a portion of the chamber end 16b of first housing 16 of the first body member B-1 which is adapted to receive the second body member B-2.

The apparatus A of the present invention further includes second body member B-2 which includes second housing 18. The second housing 18 is formed having stud bore 18a therethrough which is adapted to receive the stud S therein. An end surface 18b is preferably formed at the lower end of the stud bore 18a with annular surface 18c formed adjacent thereto and being substantially concentric with stud bore 18a. A radial lip 18d is preferably formed adjacent the upper end of the annular surface 18c with radial surface 18e formed adjacent thereto. Outer annular surface 18f is adapted to be formed adjacent to radial surface 18e such that it may be compatibly disposed within annular surface 16j of the first housing 16 of the first body member B-1, as is annular surface 18c fitted compatibly within second housing bore 16h of first housing 16.

As such, the second housing 18 is adapted to move with respect to the first housing 16 with suitable seal means 20, 22 disposed between the respective moving surfaces to ensure a fluid-tight relation therebetween. The second housing 18 further includes a camming surface 18g formed adjacent the upper end of the stud bore 18d with camming sleeve bore 18h formed adjacent thereto. Threads 18i are formed adjacent the upper end of the camming sleeve bore 18h and are adapted to receive compatibly formed threads 18j formed with end cap 18k. The end cap 18k further includes radial surface 18l and annular surface 18m having an end surface 18n formed adjacent the lower end of the annular surface 18m. Preferably, a bore 18o is formed in the end cap 18k of such a diameter that the stud S may extend therethrough as is desired. It is preferred that when the end cap 18k is properly threaded with the second housing 18, that the upper end surface 18p of the end cap 18k is substantially aligned with the upper end surface 18q of the second body member B-2, with suitable seal means 24, 26 disposed therebetween to ensure a fluid-tight relationship therebetween. The second housing 18 further includes an outer annular surface 18r having conic surface 18s disposed between the outer annular surface 18r and outer annular surface 18f.

The second body member B-2 of the apparatus A further includes a regulation cavity 18t formed having seating surface 18u and having passageways 18v, 18w in communication therewith. Preferably, the passageway 18v extends from camming sleeve bore 18h laterally into the regulation cavity 18t while the passageway 18w extends longitudinally from radial surface 18e upwardly thereinto the regulation cavity 18t as discussed more fully hereinbelow. Furthermore, the second housing 18 of the second body member B-2 includes a fluid chamber 18x formed therewith having passageways 18y, 18z in communication therewith, with passageway 18y extending between the fluid chamber 18x and the camming sleeve bore 18h while passageway 18z extends between the radial surface 18e and both the fluid chamber 18x and passageway 18y. At the lower end of passageway 18z, a vacuum release chamber 18aa is formed which communicates with the passageway 18z as discussed more fully hereinbelow.

The apparatus A of the present invention further includes gripper means or gripper assembly G which is adapted to be mounted surrounding the stud bore 18a of the second housing 18 of the second body member B-2 for gripping the stud S as desired. The gripper means G includes generally collet means C and camming means D. The collet means C is adapted to engage the stud S, with the collet means C being movable between a retracted position wherein the collet means C is not in engagement with the stud S (FIG. 1) and an engaging position wherein the collet means C is in engagement with the Stud S (FIG. 2). The collet means C includes a collet 28 which is preferably segmented into multiple sections as is illustrated in FIG. 3 and may include collet segments 28a, 28b, 28c, 28d. Preferably, the collet 28 is formed having a lower camming surface 28e with each of the collet segments and an upper camming surface 28f with the upper end of each of the collet segments of the collet 28. Preferably, the lower camming surface 28e is adapted to engage the camming surface 18g of the second housing 18 of the second body member B-2 while the upper camming surface 28f is adapted to engage a camming sleeve 30 of the gripper means G.

The camming sleeve 30 is formed having a camming surface 30a which is adapted to engage the upper camming surface 28f of the collet 28, and an outer annular surface 30b which is adapted to be compatibly disposed adjacent to the camming sleeve bore 18h of the second housing 18. The camming sleeve 30 further includes conical surface 30c, annular surface 30d, radial surface 30e, annular surface 30f and end surface 30g adjacent the upper end of the camming sleeve 30. An inner annular surface 30h is formed between the end surface 30g and radial surface 30i, which is formed adjacent to bore 30j. The bore 30j is preferably formed between the radial surface 30i and camming surface 30a. It will be appreciated that as such, the camming sleeve 30 is adapted to be compatibly received within the camming sleeve bore 18h and annular surface 18m for longitudinal movement with respect to the second body member B-2 of the present invention. Suitable seal means 32 ensures a fluid-tight relation between the outer annular surface 30b of camming sleeve 30 and camming sleeve bore 18h of second housing 18 while seal means 34 ensures a fluid-tight relation between the inner annular surface 30h of the camming sleeve 30 and the annular surface 18m of the second housing 18 of the second body member B-2.

The camming sleeve 30 is mounted for longitudinal movement with the bore 18h of the second body member B-2. Further, the camming sleeve 30 in cooperation with the camming surface 18g of the second housing 18 form the camming means designated generally as D of the present invention. It should be noted that camming surface 18g is at the same angle as the angle of the threads 10a, in order that the apparatus of the present invention be effectively used. In addition, the collet 28 is included with the collet means C of the present invention, which is adapted to engage the stud S. The collet means C is movable between a retracted position (FIG. 1) wherein the collet means C is not in engagement with the stud S and an engaging position (FIG. 2) wherein the collet means C is in engagement with the stud S. As such, the collet means C is disposed between the camming sleeve 30 and the camming surface 18g of the second housing 18 of the second body member B-2 of the camming means D. The collet means C in addition to the collet 28 includes spring means designated generally as E. The spring means E includes suitable springs 36 adapted to be disposed within cavities 28g formed within the collet segments of the collet 28 for urging the segmented collet 28 radially outwardly into a movably retracted position in the absence of the moving means M as described more fully hereinbelow.

The apparatus A for tensioning a stud S of the present invention further includes regulation means R for regulating movement of the gripper means G into engagement with the stud S prior to the second body member B-2 moving from the contracted position of FIG. 1 into the expanded position of FIG. 2. The regulation means R includes a threaded cap 38 formed having a bore 38a therein and adapted to be threadedly received with regulation chamber 18t of the second housing 18. A suitable valve 40 is formed having a valve seat 40a which is adapted to be compatible with seating surface 18u. A valve stem 40b extends from the valve seat 40a thereinto the bore 38a of cap 38, with return spring 40c acting between the cap 38 and valve 40 to normally urge the valve seat 40a into engagement with the seating surface 18u for normally blocking fluid flow through passageway 18v.

The apparatus A of the present invention further includes release means L with the moving means M for permitting releasable movement of the second body member B-2 from the expanded position of FIG. 2 to the contracted position of FIG. 1, as discussed more fully hereinbelow. The release means L includes a release valve 42 which includes a seat insert 42a mountable with the vacuum release chamber 18aa of the second housing 18, a valve 42b having valve seat 42c adapted to compatibly engage seat insert 42a in a seatable relationship. A suitable spring 42d engages the vacuum release chamber 18aa and the valve 42b for normally urging the valve 42b into position and in engagement with the seat insert 42a, for maintaining the release valve 42 in a normally closed position restricting flow through passageway 18z.

The apparatus A of the present invention includes moving means M for moving the second body member B-2 with respect to the first body member B-1 from the contracted position of FIG. 1 wherein the gripper means G may engage the stud S and an expanded position (FIG. 2) wherein the gripper means G tensions the stud S. The moving means M includes pressure force means P with the body B and in flow communication with the gripper means G and the second body member B-2. The pressure force means P forces the gripper means G into engagement with the stud S while also forcing movement of the second body member B-2 from the contracted position to the expanded position. The pressure force means P includes amplifier means I for amplifying the presure force means P as desired. More specifically, the pressure force means P preferably includes a suitable pressurized hydraulic fluid received from a fluid pressure source designated generally as 44, which may include any suitable high pressure fluid pump capable of directing pressurized hydraulic fluid therefrom, or any other suitable high pressure fluid source. The discharge of the fluid pressure source 44 is directed through flow line 46 into the amplifier means I of the apparatus A of the present invention.

The amplifier means I includes an amplifier housing 48 formed having a first bore 48a, a radial surface 48b, a second bore 48c that is preferably of a diameter less than that of the first bore 48a, and an end surface 48d. Preferably an end cap 48e is threadedly received in first bore 48a by means of threads 48f, which is sealed by seal means 48g disposed therebetween. Preferably, a suitable opening 48h is formed in the end cap 48e and is adapted to be in flow communication with flowline 46 for receiving high pressure fluid from the fluid pressure source 44. Furthermore, an opening 48i is formed adjacent the radial surface 48b for receiving fluid flowing in flowline 50 as described more fully hereinbelow. An opening 48j is formed adjacent end surface 48d for communicating with flowline 52 which extends between opening 48j of the amplifier housing 48 and fluid chamber 18x in housing 18 of the second body member B-2. A piston 54 is adapted to be disposed within the amplifier housing 48. The piston 54 includes end surface 54a, annular surface 54b, end surface 54c, rod 54d, and annular surface 54e adjacent the upper end thereof. Preferably, the annular surface 54b is adapted to be disposed adjacent to first bore 48a of the amplifier housing 48 in a sealable relation by means of seal means 56 and is adapted to move longitudinally therein. In similar fashion, annular surface 54e is adapted to be compatibly disposed within the second bore 48c of amplifier housing 48 in a sealable relation by means of seal means 58, permitting sealable, longitudinal movement thereof within the second bore 48c. Hydraulic fluid pressure entering the amplifier means I through flowline 46 acts upon end surface 54a of piston 54, to move the piston 54 upwardly as viewed in FIG. 1. Inasmuch as the fluid pressure acts upon the surface area of end surface 54a of the piston 54 which is greater than that of end surface 54f, a resultant amplification of the fluid pressure results. The magnitude of amplification is related to a ratio of the radii of the end surface 54a to that of end surface 54f. It will be appreciated that fluid exists in the chamber 60 which is defined by the end surface 54f of the piston 54, second bore 48c and end surface 48d of amplifier housing 48. As hydraulic fluid pressure is exerted from the fluid pressure source 44 through flowline 46 acting upon end surface 54a, a multiplication or amplification effect occurs within the chamber 60 thus resulting in a flow of high pressure fluid outwardly from the chamber 60 into flowline 52 of a magnitude greater than that entering the amplifier housing 48 from flowline 46.

In the use or operation of the apparatus A for tensioning a stud S extending from a surface F of the present invention, the amplified, high pressure fluid from the amplifier means I as directed through flowline 52 into the fluid chamber 18x, which is in communication therewith. The fluid pressure in the fluid chamber 18x is capable of flowing into passageway 18z, but no farther because of the release means L blocking flow therethrough. Furthermore, fluid may flow through passageway 18y thereinto an expansible chamber 62. The expansible chamber 62 is defined generally by the radial surface 18l, annular surface 18m of the second housing 18, end surface 30g, annular surface 30f, radial surface 30e, annular surface 30d, and conical surface 30c of the camming sleeve 30. As the fluid pressure acts in chamber 62, the camming sleeve 30 is urged longitudinally downwardly as shown in FIG. 1. In response to such downward longitudinal movement, the collet 28 of the collet means C is urged radially inwardly in response to camming action between the camming surface 30a of the camming sleeve 30 and upper camming surface 28f of collet 28 as well as camming action between lower camming surface 28e of the collet 28 and the camming surface 18g of the second housing 18 of the second body member B-2. Unless the fluid pressure force is sufficient to overcome the radially outwardly biasing of the spring means E, the collet means C will remain in the retracted position of FIG. 1. However, if the fluid pressure is great enough to overcome the biasing of the spring means E upon the collet means C, the collet 28 will move radially inwardly to a point where the collet threads 28h formed within the inner bore 28i of the collet 28 engage the threads 10a of the stud 10 of the stud S. As such, the collet means C is movable from the retracted position of FIG. 1 to an engaging position of FIG. 2 where the collet means C in full engagement with the threads 10a of the stud 10. However, it should be noted that prior to the collet means C being in full engagement with the threads 10a of the stud S, fluid pressure in chamber 62 does in fact communicate with passageway 18v which communicates with the regulation means R. However, the regulation means R, due to the biasing of spring 40c of the valve 40, is biased into a closed position until the collet means C is in full engagement with the threads 10a of the stud S. Further, it should be noted that it is preferred that the apparatus A be initially positioned with surface 16c not in engagement with flange surface 12 of surface F to permit the collet means C to properly engage the threads 10a of stud S. After the collet means engages the threads 10a, the camming action of the camming means D acts to move the surface 16c into engagement with surface F along with the movable action between first and second body members B-1, B-2.

After the collet means C is in full engagement with the threads 10a of the stud S, pressure builds within chamber 62 to an amount where the biasing of the spring 40c on valve 40 may be overcome, allowing pressurized fluid flow from the chamber 62 through passageway 18v, beyond the regulation means R thereinto passageway 18w and chamber 64. Chamber 64 is generally defined by radial surface 16i, annular 16j, radial surface 18e, radial lip 18d, and annular surface 18c and is volume changeable as the body B moves such that the second body member B-2 moves from the contracted position (as shown in FIG. 1) to the expanded position (as shown in FIG. 2) with respect to the first body member B-1. More particularly, as the chamber 64 increases in volume due to the high pressure fluid flowing into chamber 64, the high pressure fluid action forces the second body member B-2 to move upwardly with respect to the first body member B-1 which is in engagement with the surface F. Inasmuch as the gripper means G is in engagement with the stud S, the movement of the second body member B-2 from the contracted position to the expanded position results in tensioning of the stud S. The camming means D of the gripper means G is enhanced by the movement of the second body member B-2 with respect to the first body member B-1 from the contracted to the expanded positions. Thus, the greater the tensioning on the stud S by utilization of the apparatus A of the present invention, the greater the gripping of the gripper means G of the present invention. The movement of the body B from the contracted to the expanded position tensions the stud which in effect stretches and/or elongates the stud S.

As is shown in FIG. 1, the nut N is in a relaxed, non-tight position. In FIG. 2 this same relaxed nut position is illustrated by dotted lines 65. Inasmuch as the lower surface 14b of the nut 14 no longer engages the flange surface 12, it is necessary to thread the nut N downwardly along the threads 10a of the stud 10. This is accomplished by rotation of a socket 66 having a handle 66a affixed thereto. The handle 66a is adapted to extend from the socket body 66b outwardly through a suitably formed opening 16k formed in the first housing 16 of the first body member B-1. The socket 66 is adapted to engage the nut N for rotating such upon rotative movement of the handle 66a within the opening 16k. The socket 66 is properly located within the second nut bore 16e of the first housing 16 by suitable retaining ring 68 which is mounted with the second nut bore 16e. Thus, by rotation of the socket 66, the nut N is threaded downwardly along the stud S until the lower surface 14b of the nut 14 engages the flange surface 12 in a tight contacting relation while using apparatus A of the present invention for tensioning the stud S. As such, the nut N on the stud S may be drawn much tighter by using the apparatus A of the present invention for tensioning the stud S prior to threaded nut operations than may be expected by conventional nut rotation techniques.

Upon final securing of the nut N in engagement with the surface F, it is desirable that the apparatus A of the present invention be removed. However, it should be noted that when the gripper means G which includes the collet means C is in an engaging position and the second body member B-2 is in an expanded position, high pressure fluid is in balance on both sides of the release means L, preventing release of the release means L. In order to release the apparatus A of the present invention, it is necessary that the pressure force means P acting through flowline 46 be redirected to flow through flowline 50 to thereafter act upon end surface 54c of the piston 54. With fluid flow in the direction of flowline 50 into the amplifier means I, the piston 54 will move downwardly as viewed in FIG. 1, with fluid being forced outwardly therefrom through flowline 46. Such downward action of the piston 54 results in a vacuum being formed within chamber 60, with such vacuum being communicated through flowline 52, fluid chamber 18x, passageway 18z thereupon release means L. This vacuum acts to move the valve 42 in such a fashion that the valve seat 42c is unseated from the seat insert 42a to release the fluid pressure therein. Upon release of the fluid pressure therein, the second body member B-2 as shown in FIG. 2 may move downwardly from the expanded position to the contracted position of FIG. 1 as the vacuum continues to withdraw the second body member B-2 thereinto the first body member B-1. This vacuum action also releases the fluid pressure acting in chamber 62 to result in a relieving of the fluid pressure upon the gripper means G such that the camming means D no longer reacts with the collet means C. The collet means C thereafter may move from the engaging position of FIG. 2 to the retracted postion of FIG. 1 due to the biasing of the spring means E acting upon the collet means C.

Thus, the apparatus A and method for tensioning a stud S of the present invention provides a new and improved apparatus and method for tensioning individual studs S for thereafter tightening of the nut N threaded on the stud S, with the apparatus A adapted to be moved quickly and efficiently between studs S as desired. The apparatus A provides ease of operator manipulation and also protects the threads 10a of the stud S from damage. The apparatus A of the present invention also permits quick, high tension forces to be exerted upon studs S, with such tension forces that may easily exceed 150,000 pounds of tension in typical nut tightening operations. The apparatus A may be used quickly and efficiently with the release means L acting as a fail safe device to protect operators during use thereof from inadvertant, premature release inasmuch as affirmative operator action is required to introduce a vacuum into the amplifier means I prior to the retraction of the apparatus A from the stud S.

The foregoing disclosure and description of the invention are illustrative and explanatory thereof, and various changes in the size, shape and materials as well as in the details of the illustrated construction may be made without departing from the spirit of the invention.

We claim:

1. An apparatus for tensioning a stud extending from a surface, comprising:
   a body adapted to be removably mounted about the stud extending from the surface, said body including a first body member and a second body member;
   said first body member having a surface engaging end and a chamber end, said surface engaging end for engaging the surface and said chamber end for receiving said second body member;
   said second body member having a stud bore therethrough adapted to receive the stud therein;
   gripper means surrounding said stud bore of said second body member for gripping the stud;
   pressure force means acting within said body for moving said gripper means and said second body member, said pressure force means moving said gripper means into engagement with the stud, and said pressure force means moving said second body member from a contracted position, wherein said gripper means engages the stud, to an expanded position, wherein said gripper means tensions the stud, thereby tensioning the stud;
   regulation means operably connected to pressure force means for automatically regulating radial movement of said gripper means into engagement with the stud prior to said second body member moving from said contracted position to said expanded position; and,
   amplifier means operably connected to said pressure force means for applying an amplified vacuum releasing force.

2. The apparatus of claim 1, wherein said gripper means includes:
   segmented collets circumferentially mounted around said bore of said second body member for engaging the stud, said segmented collets being movable between a retracted position wherein said segmented collets are not in engagement with the stud and an engaging position wherein said segmented collets are in engagement with the stud;
   camming means surrounding said stud bore for camming said segmented collets for movement between said retracted position and said engaging position; and,
   spring means between said segmented collets for urging said segmented collets into a movably retracted position in the presence of said pressure force means.

3. The apparatus of claim 2, wherein said camming means includes:
   a camming sleeve mounted for longitudinal movement surrounding said stud bore of said second body member; and,
   a camming surface or said second body member.

4. The apparatus of claim 3, wherein said segmented collets are disposed between said camming sleeve and said camming surface.

5. A method for tensioning a stud extending from a surface, comprising the steps of:
   positioning a body about the stud extending from the surface, the body including a first body member and a second body member, the first body member having a surface engaging end and a chamber end, the second body member formed having a stud bore therethrough and received with the chamber of the first body member, the surface engaging end of the first body member adapted to engage the surface as a result of said positioning;
   forcing fluid pressure into the second body member for actuating a gripper assembly;
   gripping the stud with the gripper assembly within the stud bore of the second body member;
   automatically regulating distribution of said forcing fluid pressure such that the gripper assembly is forced to securely engage the stud before the second body member can be forced from the contracted position wherein the gripper assembly engages the stud to be expanded position wherein the gripper assembly tensions the stud;
   moving the second body member automatically from the contracted position after the gripper assembly engages the stud, to an expanded position wherein the gripper assembly tensions the stud; and,
   amplifying said forcing with an amplifier assembly for applying an amplified vacuum releasing force.

6. The method of claim 5, further including the steps of:
   maintaining initial maximum clearance in the stud bore in said second body member by tangentially forcing apart collet members surrounding said stud bore;
   moving collet members by use of a camming sleeve between a retracted position wherein the collet members are not in engagement with the stud and an engaging position wherein the collet members are in engagement with the stud.

7. The method of claim 6, further including the step of:
   actuating the camming sleeve with fluid pressure.

8. The method of claim 5, further including releasing the body from the stud by a predetermined series of automatically occurring steps, including:
   reducing the fluid pressure holding the second body member in the expanded position;
   initially moving the second body member towards the contracted position thereby relieving stress on the stud; and
   disengaging said gripper assembly from the stud.

9. The method of claim 5, further including the step of:
   threading a nut on the stud after said moving to retain tension on the stud by manipulating a handle connected to a socket.

* * * * *